United States Patent
Gupta et al.

(10) Patent No.: US 12,387,037 B2
(45) Date of Patent: Aug. 12, 2025

(54) CONDITIONAL VALIDATION FOR VIEW BUILDER

(71) Applicant: RAKUTEN SYMPHONY, INC., Tokyo (JP)

(72) Inventors: Rohit Gupta, Madhya Pradesh (IN); Yogesh Chouhan, Madhya Pradesh (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/756,664

(22) PCT Filed: Apr. 15, 2022

(86) PCT No.: PCT/US2022/025022
§ 371 (c)(1),
(2) Date: May 31, 2022

(87) PCT Pub. No.: WO2023/200455
PCT Pub. Date: Oct. 19, 2023

(65) Prior Publication Data
US 2024/0202432 A1    Jun. 20, 2024

(51) Int. Cl.
G06F 40/174    (2020.01)
G06F 3/0482    (2013.01)
G06F 3/04847   (2022.01)
G06F 40/177    (2020.01)

(52) U.S. Cl.
CPC ......... *G06F 40/174* (2020.01); *G06F 3/0482* (2013.01); *G06F 3/04847* (2013.01); *G06F 40/177* (2020.01)

(58) Field of Classification Search
None
See application file for complete search history.

(56) References Cited

U.S. PATENT DOCUMENTS

| | | |
|---|---|---|
| 10,795,649 B1 | 10/2020 | Drake et al. |
| 11,513,778 B1* | 11/2022 | Graves ..................... G06F 8/38 |
| 2005/0071752 A1* | 3/2005 | Marlatt ................. G06F 40/186 715/222 |
| 2007/0074101 A1 | 3/2007 | Uthe |
| 2011/0118908 A1* | 5/2011 | Boorman ............. G08G 5/0021 701/14 |
| 2011/0276875 A1 | 11/2011 | Mccabe et al. |
| 2011/0302483 A1* | 12/2011 | Greenberg ............ G06F 40/174 715/222 |
| 2014/0279573 A1* | 9/2014 | Coats ..................... G06Q 50/16 705/306 |
| 2015/0089345 A1 | 3/2015 | Marimuthu et al. |

(Continued)

*Primary Examiner* — Tuan S Nguyen
(74) *Attorney, Agent, or Firm* — HAUPTMAN HAM, LLP

(57) ABSTRACT

A system for conditional validation in forms includes at least one processor, and at least one memory coupled to the at least one processor and configured to store executable instructions. The executable instructions, when executed by the at least one processor, cause the at least one processor to visually present a plurality of parameters for defining at least one condition for controlling a property of a first field of a form in a configuration mode, generate a condition corresponding to a set of user inputs for the plurality of parameters, and store the generated condition with the form. The condition is based on a second field different from the first field.

20 Claims, 15 Drawing Sheets

(56) References Cited

U.S. PATENT DOCUMENTS

| | | | |
|---|---|---|---|
| 2016/0381122 A1* | 12/2016 | Glommen | H04L 67/10 709/203 |
| 2018/0121026 A1* | 5/2018 | Nadig | G06F 40/103 |
| 2019/0361795 A1 | 11/2019 | Cole et al. | |
| 2020/0380071 A1 | 12/2020 | Sundar et al. | |

* cited by examiner

FIG. 3A

CONDITIONAL_VALIDATION

Mandatory
THIS_FIELD_WILL_BE_MANDATORY
Yes — 302
☐ Expression — 304

When
PLEASE_SELECT_FIELD* — 306
Site Address 1

Please select condition* — 308
Equal

PLEASE_SELECT_VAUE* — 310
Other

Cancel — 316    Save — 318

FIG. 3B

CONDITIONAL_VALIDATION

PLEASE_SELECT_FIELD* — 306
Site Address 1

Please select condition* — 308
Equal

PLEASE_SELECT_VALUE* — 310
Other

Other* — 312
Tokyo ✕   Enter Value — 314

+ ADD_CONDITIONS — 302

EDITABLE

Cancel — 316    Save — 318

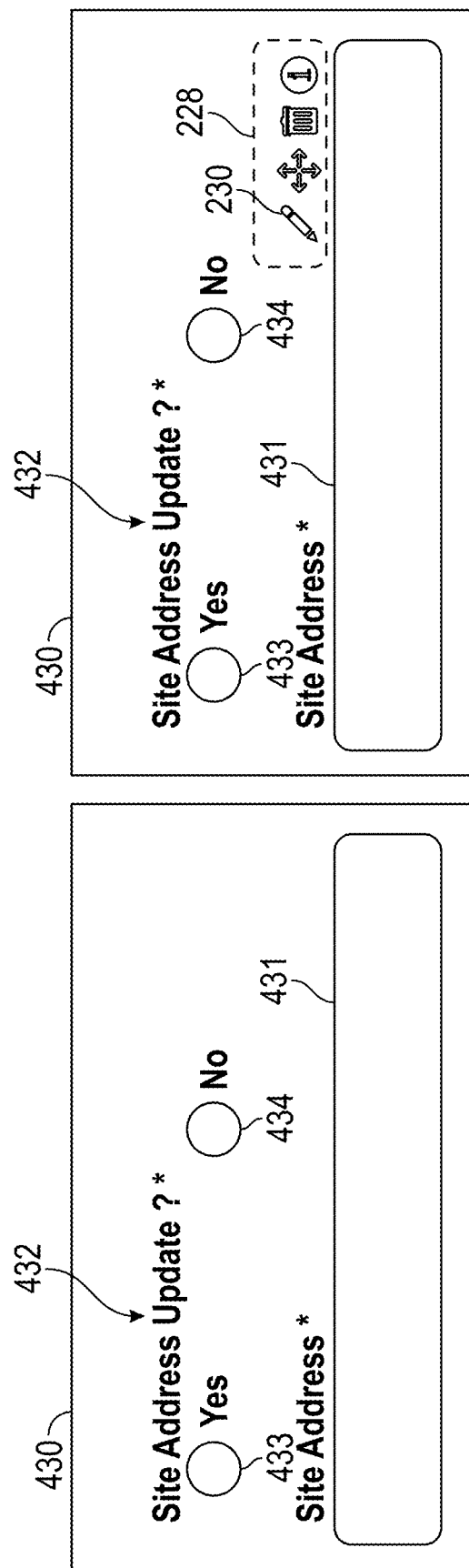

FIG. 4C

Edit Text Field

Conditional Validation

Mandatory

Editable
This field will be editable — 404
Yes

☐ Expression — 420
When
Please select field*
Please Select — 406
Please select condition*
Please Select — 408
Please select value* — 410

Cancel — 416    Save — 418

FIG. 4D

Edit Text Field

Conditional Validation

Yes — 402
☐ Expression — 420
When
Please select field*
Site Address Update? — 406
Please select condition*
Equal — 408
Please select value*
Other — 410
Other* — 422
Yes Cancel — 416    Save — 418

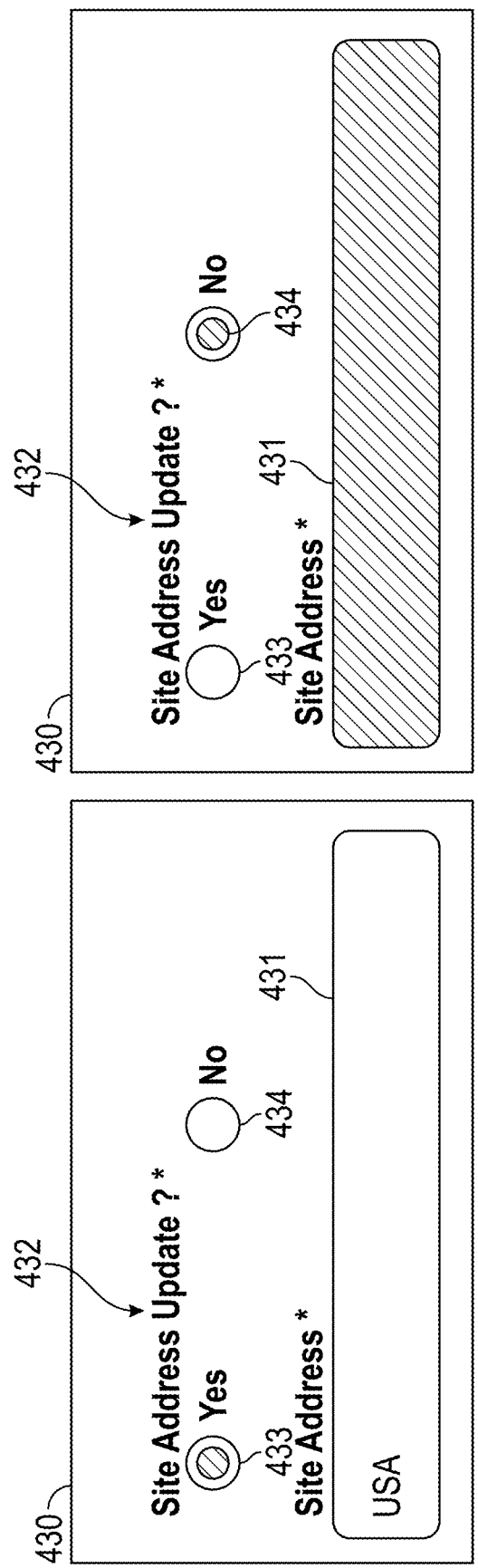

FIG. 5A

Conditional Validation

Mandatory

Editable

Visible — 502
This field will be visible — 504
Yes

☐ Reset Field Data on Hide

☑ Expression — 520

All Components
Please Select — 526

FIG. 5B

Expression* — 502, 522

(data.PreconSow.ifYesAgencysEnvironm
entalDocumentationProvided==='No'&&
data.PreconSow.environmental
DocumentationProvidedByTribe
==='No'&&

Background

Cancel — 516
Save — 518

530 — Is Temporary Construction Equipment Required?* ← 532

○ Yes  ⊘ No
533    534

Type of Temporary Construction Equipment ← 535

▷

Proposed Overall Height of Temporary Construction Equipment? ← 536

530 — Is Temporary Construction Equipment Required?* ← 532

○ Yes  ⊘ No
533    534

- County: District of Columbia (631)
- State: DC (632)
- Region: Central (633)
- Site Address Update ? *  ○ Yes  ⊘ No

FIG. 6C

- County: Banner (631)
- State: NE (632)
- Region: NorthEast (633)
- Site Address Update ? *  ⊘ Yes  ○ No

CONDITIONAL VALIDATION FOR VIEW BUILDER

RELATED APPLICATIONS

The present application is a National Phase of International Application No. PCT/US2022/025022, filed Apr. 15, 2022.

RELATED APPLICATION(S)

This application is related to U.S. patent application Ser. No. 17/757,361, filed Jun. 15, 2022.

BACKGROUND

Fillable forms are used in various aspects of life and work, throughout multiple industries, services, applications etc. Considerations are given to form designs that are intuitive and user-friendly for both the designers/creators who create forms, and end-users who use the forms for data entry and/or manipulation.

BRIEF DESCRIPTION OF THE DRAWINGS

Aspects of the present disclosure are best understood from the following detailed description when read with the accompanying FIGS. In accordance with the standard practice in the industry, various features are not drawn to scale. In fact, the dimensions of the various features be arbitrarily increased or reduced for clarity of discussion.

FIGS. 3A-3D are schematic diagrams related to a Mandatory property, in accordance with some embodiments. Specifically, FIGS. 3A and 3B are schematic diagrams showing various parameters for defining at least one condition for controlling the Mandatory property of a selected field of a form in the configuration mode. FIGS. 3C-3D are schematic diagrams showing various visually presented states of the field and/or the form depending on whether the defined condition of the Mandatory property is met, when the form is in an execution mode.

FIGS. 4A-4F are schematic diagrams related to an Editable property, in accordance with some embodiments. Specifically, FIG. 4A is a schematic diagram showing a field to be selected for editing in a form, FIG. 4B is a schematic diagram showing the field when selected, and FIGS. 4C-4D are schematic diagrams showing various parameters for defining at least one condition for controlling the Editable property of the selected field of the form in the configuration mode. FIGS. 4E-4F are schematic diagrams showing various visually presented states of the field and/or the form depending on whether the defined condition of the Editable property is met, when the form is in the execution mode.

FIGS. 5A-5G are schematic diagrams related to a Visible property, in accordance with some embodiments. Specifically, FIGS. 5A-5B are schematic diagrams showing an alternative option for defining at least one condition for controlling the Visible property of a selected field of a form in the configuration mode. FIGS. 5C-5D are schematic diagrams showing various visually presented states of a field and/or a form depending on whether a defined condition of the Visible property for the field is met, when the form is in the execution mode. FIGS. 5E-5G are schematic diagrams showing various visually presented states of various fields in a form depending on whether a defined condition of the Visible property is met, when the form is in the execution mode.

FIGS. 6A-6C are schematic diagrams related to a Background property, in accordance with some embodiments. Specifically, FIG. 6A is a schematic diagram showing various parameters for defining at least one condition for controlling the Background property of a selected field of a form in the configuration mode. FIGS. 6B-6C are schematic diagrams showing various visually presented states of the field and/or the form depending on whether the defined condition of the Background property is met, when the form is in the execution mode.

DETAILED DESCRIPTION

Figure 1:
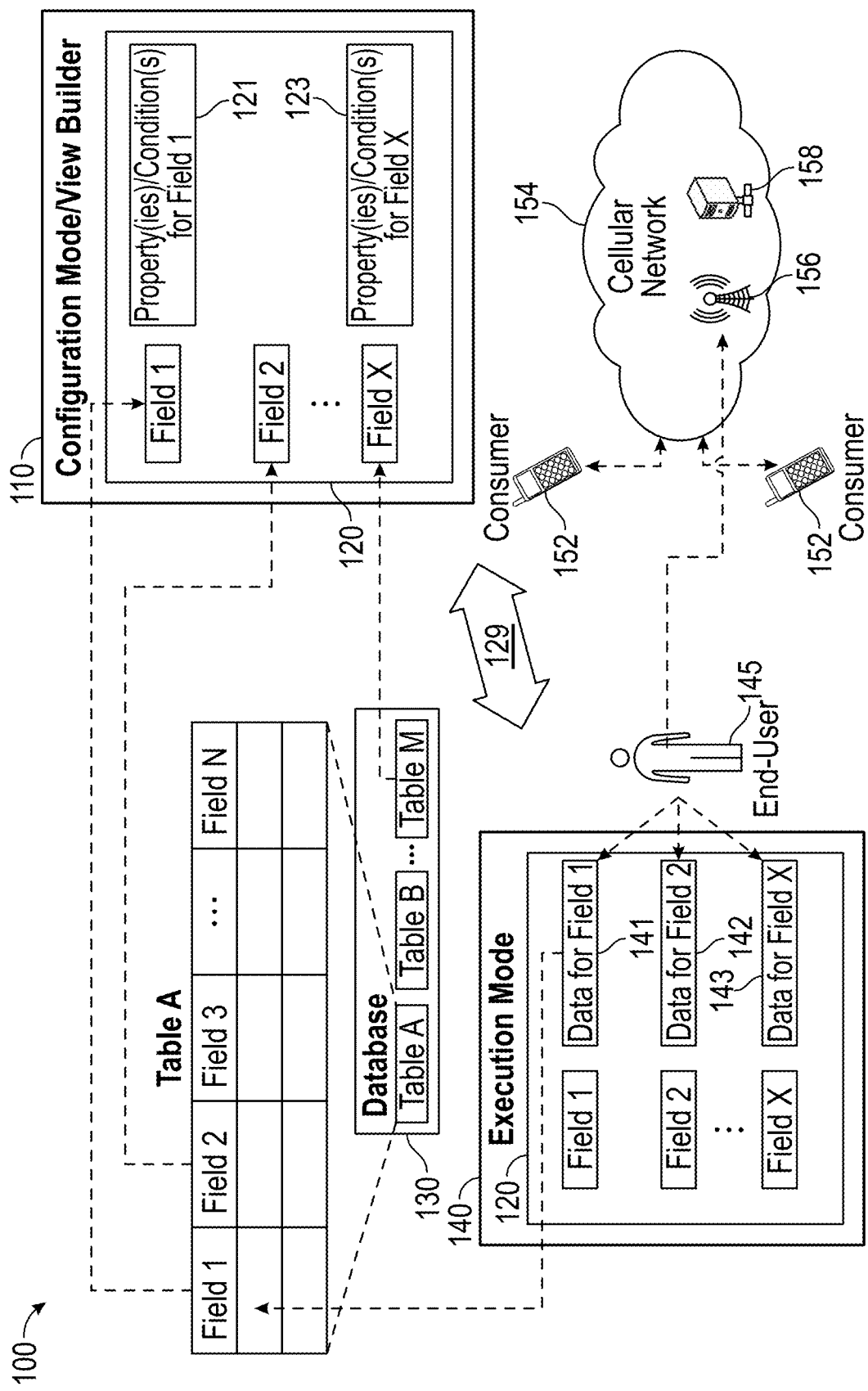
FIG. 1 is a schematic diagram of a system with a view builder using conditional validation, in accordance with some embodiments.

The following disclosure includes many different embodiments, or examples, for implementing different features of the subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows include embodiments in which the first and second features are formed in direct contact, and also include embodiments in which additional features be formed between the first and second features, such that the first and second features not be in direct contact. In addition, the present disclosure repeats reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper" and the like, be usable herein for ease of description to describe one element or feature's relationship to another element(s) or feature(s) as illustrated in the FIGS. The spatially relative terms are intended to encompass different orientations of the device in use or operation in addition to the orientation depicted in the FIGS. The apparatus be otherwise oriented (rotated 90 degrees or at other orientations) and the spatially relative descriptors usable herein likewise be interpreted accordingly.

A form builder or view builder is a computerized tool (e.g., software executed on/by hardware, such as a processor) that is provided to assist a user to create forms. In some situations, a form is created or designed to include one or more fields having a property that changes dynamically depending on whether a condition is satisfied or not. Such a property is sometimes referred to as a conditional validation. In some embodiments, to assist a user to create or modify forms with conditional validations, a view builder is configured to present to the user a graphical user interface (GUI) in which various parameters for defining a condition for a conditional validation in a form are selectable and/or enterable. Based on the user's selection(s) and/or entry(ies), the view builder is configured to automatically generate the condition and source code corresponding to the condition. The automatically generated source code is stored by the view builder with the form, e.g., in a non-transitory computer-readable medium, for later use by an end-user who uses the form for data entry. As the end-user interacts with the form, the condition is validated, or not validated, resulting in different behaviors of the form and providing the end-user with an intuitive and user-friendly interface for data entry.

In at least one embodiment, the described automatic generation of source code based on user selection(s) and/or entry(ies) of one or more parameter for defining the condition is an advantage over other and/or existing approaches. In the other and/or existing approaches, for creating a form, a user needs to write source code. Every parameter is hard coded in the source code itself and, sometimes, the source code is so complex for the user (e.g., a human) to handle manually. If the user wants to modify a single parameter, then the user interface and backend service code need to be manually rewritten which is an error-prone process with additional cost, labor, time, and/or delayed deployment of the product (e.g., the modified form). In contrast, in some embodiments, the user simply selects parameters visually presented to the user on the GUI or enters a customizable parameter, and the view builder automatically generates source code based on the user selection(s) and/or entry(ies). This procedure is applicable to both adding a new conditional validation or modifying an existing conditional validation, and requires no coding by the user. As a result, it is possible to reduce cost, time, labor, user skill level required for form creation. Further features and/or advantages are within the scopes of various embodiments.

FIG. 1 is a schematic diagram of a system 100 with a view builder 110 using conditional validation, in accordance with some embodiments.

In some embodiments, the view builder 110 comprises software executed on/by hardware. An example hardware configuration for executing the view builder 110 includes a computer system described with respect to FIG. 9. For example, the view builder 110 includes executable instructions stored in at least one memory and executed by at least one processor. In at least one embodiment, the view builder 110 is developed in Angular which is a platform for building mobile and/or desktop web applications. Other platforms and/or software configurations are within the scopes of various embodiments.

The view builder 110 is configured to handle (e.g., open or process) a form 120 in a configuration mode in which the form 120 is created or modified by a user through a GUI provided by the view builder 110. In some embodiments, the view builder 110 is further configured to handle the form 120 in an execution mode in which the form 120 behaves as though it had been deployed for data entry and/or manipulation. This function of the view builder 110 is to enable the user to preview and/or test behaviors the created or modified form 120 before deployment for use by end-users. The same execution mode of the form 120 is viewed and used by end-users for data entry and/or manipulation after deployment.

Herein, a user is someone who creates or modifies a form, whereas an end-user is someone who uses the form for data entry and/or manipulation. In an example, a user is a form creator or designer or developer who initially creates a form, and who may subsequently modify or update the form upon request of an end-user or a customer that acquired the form from the creator/designer/developer. In another example, a user is an admin, or a person with sufficient privileges, of the customer (e.g., a company), and such admin or person may create, modify or update forms themselves using the view builder 110, without having to go back to the creator/designer/developer. In some embodiments, the ability of a customer to create, modify or update forms themselves by using the view builder 110 is a further advantage over other and/or existing approaches.

The form 120 comprises a plurality of fields, such as Field 1, Field 2, . . . Field X. The quantity of fields in the form 120 is not limited to any particular number. The fields of the form 120 come from various resources. Example resources include relations and/or tables stored in at least one database. In the example configuration in FIG. 1, a database 130 includes a plurality of tables, such as Table A, Table B, . . . Table M. The quantity of tables in the database 130 is not limited to any particular number. Table A is illustrated in greater detail in FIG. 1, and comprises a plurality of fields, such as Field 1, Field 2, Field 3 . . . Field N. The quantity of fields in Table A is not limited to any particular number. Other tables in the database 130 are configured similarly to Table A, and may comprise one or more common fields with Table A, or may comprise fields completely different from those of Table A. Other table configurations and/or database configurations are within the scopes of various embodiments. In some embodiments, the database 130 is maintained by, or contains data of, a customer for data entry and/or manipulation. In some embodiments, the fields in the form 120 are selected from fields of multiple databases.

Fields in the form 120 may come from the same table and/or different tables. For example, Field 1 and Field 2 of the form 120 correspond to Field 1 and Field 2 of Table A, whereas Field X of the form 120 corresponds to a corresponding field (not shown) in Table M. In some embodiments, the customer provides a form designer with a list of fields in the database 130, and the form designer designs the form 120 by selecting Field 1, Field 2, . . . Field X from the provided list.

A field in the form 120 is a conditional field or a non-conditional field. A conditional field is a field associated with at least one conditional validation. A non-conditional field is a field associated with no conditional validation. In the example configuration in FIG. 1, Field 1 and Field X of the form 120 are conditional field, whereas Field 2 is a non-conditional field. Each conditional field has one or more conditional validations associated therewith. A conditional validation corresponds to a property of the conditional field, and at least one condition which controls the property to have different values depending on whether the condition is satisfied or not. In the example configuration in FIG. 1, Field 1 has at least one conditional validation 121 which corresponds to at least one property of Field 1 and one or more associated conditions, and Field X has at least one conditional validation 123 which corresponds to at least one property of Field X and one or more associated conditions. Field 2 has no corresponding conditional validation. The conditional validations 121, 123 are created and/or modified through a GUI provided by the view builder 110 as described herein. In some embodiments, the conditional validations 121, 123 are stored together with the form 120, e.g., in a non-transitory computer-readable medium. In at least one embodiment, the form 120 is described by a file referred to as a JavaScript Object Notation (JSON) configuration, and the conditional validations 121, 123 are stored in the same JSON configuration. Other arrangements are within the scopes of various embodiments.

As schematically illustrated by an arrow 129, the form 120 is switchable between the configuration mode in the view builder 110 and an execution mode. In the execution mode, the form 120 is rendered, e.g., based on the JSON configuration of the form 120, either by the view builder 110 for previewing/testing before deployment, or by a computer system 140 for data entry and/or manipulation after deployment. A difference in the execution mode of the form 120 at the view builder 110 and at the computer system 140 is that, in the execution mode at the computer system 140, the form 120 is linked to the resources of its fields, e.g., to the database 130, for data entry and/or manipulation, whereas in the execution mode at the view builder 110, the form 120 is not yet linked to the database 130. Other than the described difference, the form 120 in the execution mode behaves in substantially the same way at the view builder 110 and the computer system 140. An example hardware configuration for the computer system 140 is described with respect to FIG. 9.

In the execution mode, the form 120 is configured as a GUI to enable data entry and/or manipulation at its fields. For example, data 141, 142, . . . 143 are enterable into corresponding Field 1, Field 2, . . . Field X of the form 120 in the execution mode. When the form 120 is in the execution mode at the computer system 140, Field 1, Field 2, . . . Field X of the form 120 are linked to the corresponding fields in the database 130. For simplicity, the link from Field 1 of the form 120 in the execution mode to the corresponding Field 1 in Table A is schematically illustrated in FIG. 1, whereas the links from the other fields in the form 120 to the corresponding fields in the database 130 are omitted. In some embodiments, one field in the form 120 is linked to multiple corresponding fields and/or multiple tables of the database 130. In some embodiments, the form 120 in the execution mode is linked to the database 130 through a network by executing an application on the computer system 140.

The form 120 in the execution mode enables an end-user 145 to enter data 141, 142, . . . 143 into the corresponding Field 1, Field 2, . . . Field X which feed the entered data 141, 142, . . . 143 to the corresponding fields in the database 130. In the example configuration in FIG. 1, the end-user 145 enters data into the form 120 while performing one or more tasks related to a cellular network. This is only an example application of forms created/modified by the view builder 110. Other fields, industries, applications, services, etc., in which forms created/modified by the view builder 110 are usable, are within the scopes of various embodiments.

In the cellular network example in FIG. 1, consumers' mobile terminals 152 are coupled to the cellular network 154 to receive communication services. In an example, the cellular network 154 comprises a plurality of cells (not shown) in which cellular services are provided, through corresponding base stations. A representative base station 156 is illustrated in FIG. 1. The base stations constitute a radio access network, and are coupled to a core network of the cellular network 154. A representative network device 158 of the core network is illustrated in FIG. 1. Examples of the cellular network 154 include, but are not limited to, a long term evolution (LTE) network, a fifth generation (5G) network, a non-standalone (NSA) network, a standalone (SA) network, a global system for mobile communications (GSM) network, a general packet radio service (GPRS) network, a code-division multiple access (CDMA) network, a Mobitex network, an enhanced GPRS (EDGE) cellular network, or the like. Example configurations of the base stations include cell towers each having one or more cellular antennas, one or more sets of transmitter/receivers transceivers, digital signal processors, control electronics, a Global Positioning System (GPS) receiver for timing (e.g., for CDMA2000/IS-95 or GSM systems), primary and backup electrical power sources, and sheltering. Examples of mobile terminals 152, include, but are not limited to, cell phones, tablets, media players, gaming consoles, personal data assistants (PDAs), laptops, and other electronic devices configured to transmit and/or receive cellular communication to/from the base stations of the cellular network 154. An example hardware configuration of a mobile terminal and/or a base station includes a computer system described with respect to FIG. 9, with the addition of one or more cellular antennas and corresponding cellular transceiving circuitry. Examples of communication technologies for performing cellular communications between base stations and mobile terminals include, but are not limited to, 2G, 3G, 4G, 5G, GSM, EDGE, WCDMA, HSPA, CDMA, LTE, DECT and WiMAX. Examples of services provided over cellular communication, herein referred to as cellular communication services, include, but are not limited to, voice calls, data, emails, messages such as SMS and MMS, applications, and control signals. Example components (or network devices 158) of the core network include, but are not limited to, serving gateways (SGW), high rate packet data serving gateway (HSGW), packet data network gateway (PGW), packet data serving node (PDSN), mobility management entity (MME), home subscriber server (HSS), and policy control rules function (PCRF). The components of the core network are coupled with each other and with the base stations by one or more public and/or proprietary networks. An example hardware configuration of a component or network device 158 of the core network includes a computer system described with respect to FIG. 9.

Example tasks that the end-user 145 may perform using the form 120 include, but are not limited to, surveying a physical site for installing a base station, checking operations of various equipment at a base station or a network device, or the like. Responsive to one or more factors, such as entered data, objects for which the task is performed, or the like, one or more conditional validations in the form 120 are executed and/or updated in real time to change the behaviors of the corresponding fields to provide the end-user 145 with an intuitive and user-friendly interface for data entry and/or manipulation. For example, the conditional validations are executed and/or updated to show which field is required (mandatory) or optional, and/or show whether a field is editable or not, and/or hide a field that is unnecessary for the current task to simplify the user interface for the end-user 145, and/or highlight a field that requires attention of the end-user 145, etc. Such and/or other conditional validations are created and/or modified for the form 120 in an easy to understand and to perform manner through the view builder 110, as described herein.

Figure 2B:
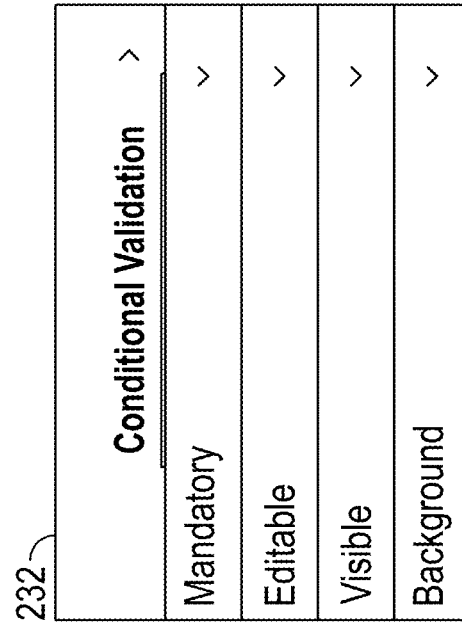
FIG. 2B is a schematic diagram showing a selected field of the form.
Figure 2C:
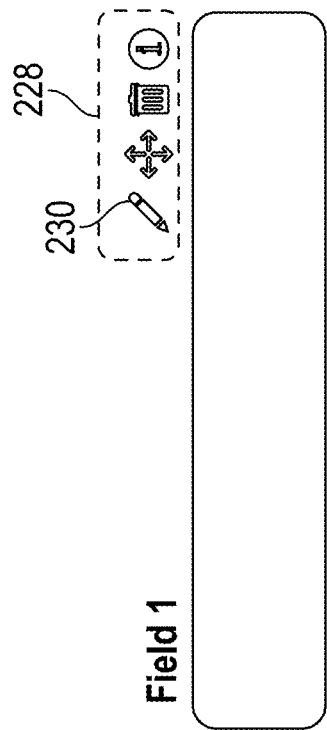
FIG. 2C is a schematic diagram showing various controllable properties of the selected field, in accordance with some embodiments.
Figure 2A:
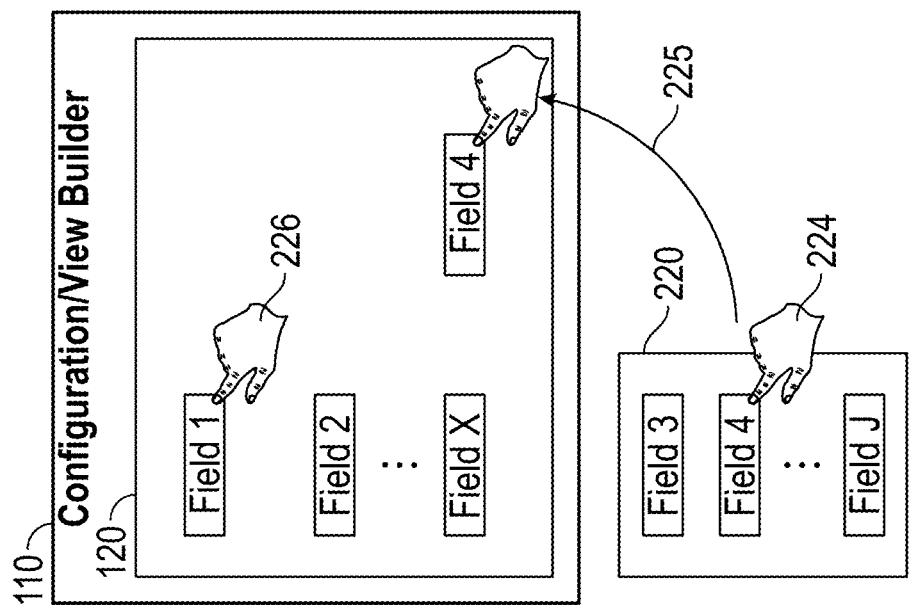
FIG. 2A is a schematic diagram showing a form in a configuration mode.

FIG. 2A is a schematic diagram showing the form 120 in the configuration mode as being visually presented in a GUI of the view builder 110, in accordance with some embodiments. FIG. 2B is a schematic diagram showing a selected field, e.g., Field 1, of the form 120, in accordance with some embodiments. FIG. 2C is a schematic diagram showing various controllable properties of the selected field, in accordance with some embodiments.

An example of visual presentation of a form, field, GUI, parameter, value, item or the like, includes displaying the form, field, GUI, parameter, value, item or the like, on a display, such as a monitor or a touch screen. Other ways for visually presenting information, such as projection on a screen, three-dimensional (3D) projection, using glasses and/or other head-mounted devices, or any other manners for presenting information to be visually perceptible by a user, are within the scopes of various embodiments. For simplicity, "displaying" or "displayed" is used in the following description as an example manner for visual presentation of information. Other manners for visual presentation, as discussed herein, are not excluded. A user may interact with displayed, or otherwise visually presented, information by a pointing device (e.g., a mouse), a touch screen, contactless gestures, or the like.

FIG. 2A illustrates a further operation made available by the view builder 110 in one or more embodiments, i.e., adding new a field. This field addition operation is usable by a user to create a form from a blank template by adding fields to the template, or to add a new field to an existing form, e.g., upon request from a customer or end-user. Specifically, when the field addition operation is selected, e.g., by user interaction (not shown) with the GUI of the view builder 110, a list 220 of available fields, i.e., Field 3, Field 4, . . . Field J, is displayed. In at least one embodiment, the list 220 includes fields of one or more or all tables in the database 130. In at least one embodiment, the list 220 is limited to include those fields relevant to the tasks for which the form 120 is designed. In at least one embodiment, the list 220 includes fields other than those already included in the list 220. In at least one embodiment, the list 220 includes one or more fields already included in the form 120. In an example field addition operation, the user selects, at 224, Field 4 in the list 220, and adds Field 4 to the form 120, e.g., by a drag and drop operation 225. Once added to form 120, Field 4 is modifiable to create or update a conditional validation therefor in a manner similar to that described herein.

In an example, to create or update a conditional validation for Field 1, the user selects, at 226, Field 1. In response to user selection of Field 1, a menu 228 is displayed for selected Field 1, as shown in FIG. 2B. The menu 228 comprises various options for interacting with selected Field 1, such as edit, move, delete, and additional information. In response to user selection of the edit option 230, a screen 232 is displayed by the GUI of the view builder 110, as shown in FIG. 2C.

In the example configuration in FIG. 2C, conditional validations available for a selected field includes Mandatory, Editable, Visible, and Background. This list of conditional validations is an example, and other conditional validations are within the scopes of various embodiments.

The conditional validation Mandatory corresponds to a Mandatory property of a field and one or more associated conditions which, when satisfied, configure the field as mandatory to require data to be entered in the field when the form is rendered in the execution mode. When the one or more conditions are not satisfied, the field is configured as optional, i.e., data may be entered, but not required, in the field. An alternative configuration, i.e., the field is mandatory when the one or more conditions are not satisfied and is optional when the one or more conditions are satisfied, is included in one or more embodiments. An example for configuring the conditional validation Mandatory is described with respect to FIGS. 3A-3D.

The conditional validation Editable corresponds to an Editable property of a field and one or more associated conditions which, when satisfied, configure the field as editable to permit data to be entered in the field when the form is rendered in the execution mode. When the one or more conditions are not satisfied, the field is configured as non-editable, i.e., data entry in the field is prevented, e.g., by greying-out the field. An alternative configuration, i.e., the field is editable when the one or more conditions are not satisfied and is non-editable when the one or more conditions are satisfied, is included in one or more embodiments. An example for configuring the conditional validation Editable is described with respect to FIGS. 4A-4F.

The conditional validation Visible corresponds to a Visible property of a field and one or more associated conditions which, when satisfied, cause the field to be visible (or shown) in the form when the form is rendered in the execution mode. When the one or more conditions are not satisfied, the field becomes invisible (or hidden). An alternative configuration, i.e., the field is shown when the one or more conditions are not satisfied and is hidden when the one or more conditions are satisfied, is included in one or more embodiments. An example for configuring the conditional validation Visible is described with respect to FIGS. 5A-5D.

The conditional validation Background corresponds to a Background property of a field and one or more associated conditions which, when satisfied, cause the field to be visibly presented in a predetermined format distinctive from other fields in the form when the form is rendered in the execution mode. For example, a background of the field is highlighted in a different color, e.g., blue or grey, from the other field. Other manners for distinctively displaying the field are within the scopes of various embodiments. When the one or more conditions are not satisfied, the field is displayed in the same manner or format as the other fields in the form, i.e., the field is not highlighted. An alternative configuration, i.e., the field is highlighted when the one or more conditions are not satisfied and is not highlighted when the one or more conditions are satisfied, is included in one or more embodiments. An example for configuring the conditional validation Background is described with respect to FIGS. 6A-6C.

Figure 3C:
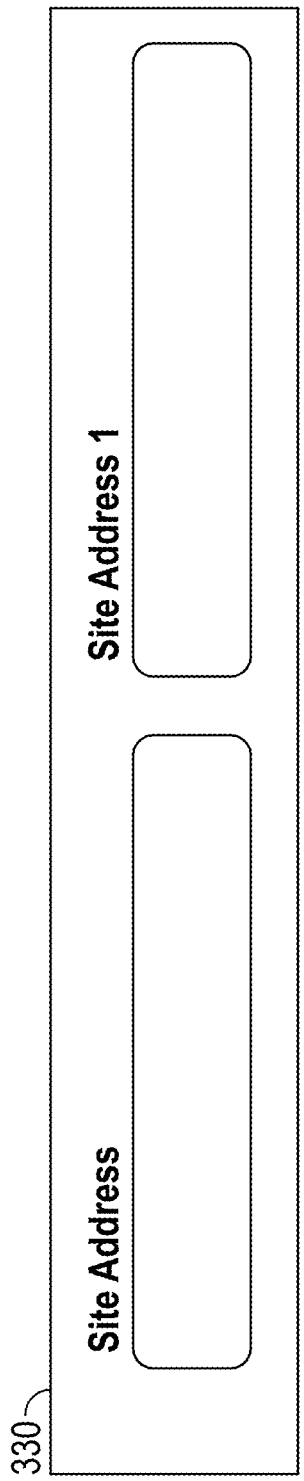
Figure 3D:
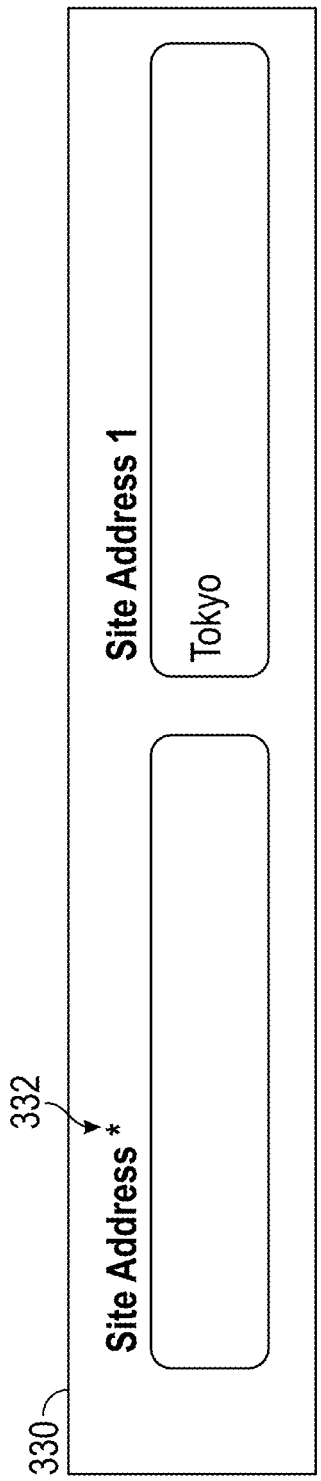

FIGS. 3A-3D are schematic diagrams related to the Mandatory property, in accordance with some embodiments. Specifically, FIGS. 3A and 3B are schematic diagrams showing various parameters for defining at least one condition for controlling the Mandatory property of a selected field of a form in the configuration mode. FIGS. 3C-3D are schematic diagrams showing various visually presented states of the field and/or the form depending on whether the defined condition of the Mandatory property is met, when the form is in an execution mode.

In response to user selection of Mandatory in the screen 232 in FIG. 2C, the view builder 110 causes a screen 300 to be displayed as shown in FIG. 3A. FIG. 3B shows a lower portion of the screen 300 when the screen 300 is scrolled down by a scroll bar 302, or a corresponding gesture.

In FIG. 3A, the screen 300 includes drop-down menus 304, 306, 308, 310 each for selecting a corresponding parameter in a plurality of parameters of the conditional validation Mandatory. The drop-down menu 304 is for selecting a value of the Mandatory property. The drop-down menus 306, 308, 310 are for selecting parameters that define a condition for the conditional validation Mandatory. The screen 300 further comprises a check box 320 which, when checked, causes the view builder 110 to display an expression input area for the user to manually enter one or more conditions instead of defining conditions through the drop-down menus 306, 308, 310. Further details about this expression option associated with the check box 320 are described with respect to FIGS. 5A-5B.

The drop-down menu 304, when selected, visually presents to the user a first list of selectable values, such as "Yes" (shown in FIG. 3A) and "No" (not shown) of the Mandatory property. Upon user selection of "Yes" from the drop-down menu 304, the conditional validation Mandatory is configured such that selected field will be a mandatory field when the condition is satisfied. Upon user selection of "No" from the drop-down menu 304, the conditional validation Mandatory is configured such that selected field will be a non-mandatory (optional) field when the condition is satisfied.

The drop-down menu 306, when selected, visually presents to the user a second list of selectable fields usable in defining a condition for controlling the Mandatory property of the selected field. In some embodiments, this second list of selectable fields is similar to the list 220 described with respect to FIG. 2A. In some embodiments, the second list of selectable fields that is displayed when the drop-down menu 306 is selected includes other fields in the same form as and/or in different forms from the selected field, and/or other fields in the same table as and/or in different tables from the table of the selected field. In at least one embodiment, the second list of selectable fields includes fields in the same database as the selected field. The selected field is hereinafter referred to as the first field, and another field selected from the drop-down menu 306 is hereinafter referred to as the second field. A condition for controlling whether the first field is a mandatory field is based on the different, second field. In an example related to a form usable with respect to a cellular network, the drop-down menu 306 when selected displays fields such as "Site Address 1," "FA Code," "USID," "Is this site designated with Quite Zone?," "Project Number," "Link ID," or the like.

The drop-down menu 308, when selected, visually presents to the user a third list of selectable relations (or conditions) to be used with the other parameters selected by the drop-down menus 304, 310 to define a condition for the conditional validation. In some embodiments, the third list of selectable relations includes "Empty," "Not empty," "Equal," "Not Equal," "Greater than," "Less than," or the like.

The drop-down menu 310, when selected, visually presents to the user a fourth list of one or more selectable values for the second field selected from the drop-down menu 306. The fourth list additionally or alternatively includes a selectable item "Other" for permitting the user to enter a value not found in the fourth list. When the item "Other" is selected from the drop-down menu 321 as shown in FIG. 3A, the view builder 110 displays an input area 312 for the user to enter a desired value. Herein, a value may be a number, logic value, a string of text, or the like. In the example in FIG. 3B, the user input "Tokyo" in the input area 312.

Based on the parameters received by user selections and/or inputs via the drop-down menus 306, 308, 310, a condition is defined. These parameters are collectively referred to as a set of user inputs. In the example in FIG. 3B, the condition defined by the set of user inputs is "Site Address 1 is Equal to Tokyo." In this example, "Site Address 1" is the second field. Coupled with the value selected at the drop-down menu 304, the conditional validation Mandatory is defined as: the first field will be a mandatory field when Site Address 1 is Equal to Tokyo.

As shown in FIG. 3B, a button 314 is displayed to permit the user to add another condition in the same conditional validation. When the button 314 is selected, the user may select/enter, by the same drop-down menus 306, 308, 310 or by similar drop-down menus, a further set of user inputs defining a further condition. For example, the further condition is "FA Code is Empty," where "FA code" is a selected third field, and "Empty" is a selected relation. A selected value is not required because of the selected relation "Empty." In some embodiments, a logic operand, such as AND, OR, or the like, is insertable between different conditions, by user selection of an appropriate operand in another drop-down menu (not shown) of the view builder 110. In this specific example, an operand AND is inserted between the conditions, resulting in a conditional validation with two conditions as follows: the first field will be a mandatory field both when Site Address 1 is Equal to Tokyo and when FA Code is Empty. One or more further conditions may be defined by repeating the described process of operating the button 314 and selecting/entering another set of user inputs. As a result, it is possible to apply/enforce multiple conditions on a selected field using other different available fields from various resources (e.g., tables).

The screen 300 further comprises a Cancel button 316 for cancelling the editing/modifying operation, and a Save button 318 for accepting/saving the defined conditions and/or conditional validation. In at least one embodiment, upon the user operating (e.g., clicking) the Save button 318, the defined conditions and/or conditional validation are accepted, and the view builder 110 is configured to automatically generate source code corresponding to the defined conditions and/or conditional validation. The automatically generated source code is then stored with the form. In some embodiments, the form is described by a JSON configuration, and the automatically generated source code of the defined conditional validation includes corresponding JSON expressions added to the JSON configuration of the form. In at least one embodiment, no writing or creation of an Extensible Markup Language (XML) or Hyper Text Markup Language (HTML) file is required in the automatic generation of source code of the defined conditional validation. In at least one embodiment, no manual coding by the user is required. The user simply selects one or more parameters from the drop-down menus 304, 306, 308, 310 and/or enters a desired value (e.g., "Tokyo" at input area 312). The described editing/modifying operation for adding/changing a conditional validation is intuitive and user-friendly, and requires no programing skill on the part of the user who may be a customer.

In FIGS. 3C-3D, a portion of a form 330 for which a conditional validation Mandatory is defined as described with respect to FIGS. 3A-3B is shown in the execution mode. In this example, the first field to be controlled is "Site Address," the second field is "Site Address 1," the conditional validation includes one condition based on the second field and is defined as: Site Address will be a mandatory field when Site Address 1 is Equal to Tokyo.

In FIG. 3C, the value (nil) in the second field "Site Address 1" is not equal to "Tokyo," the condition is not satisfied, and the first field "Site Address" is not a mandatory field, i.e., "Site Address" is an optional field in which data may be entered, but not required.

In FIG. 3D, when the user (while testing/previewing the form 330 at the view builder 110) or an end-user (while using the form 330 for data entry and/or manipulation) enters "Tokyo" into the second field "Site Address 1," the condition is satisfied, and the first field "Site Address" is dynamically changed in real time to a mandatory field as indicated by an asterisk symbol 332 added to the field name "Site Address." Data are now required to be entered into the mandatory field "Site Address."

FIGS. 4A-4F are schematic diagrams related to an Editable property, in accordance with some embodiments. Specifically, FIG. 4A is a schematic diagram showing a field 431 to be selected for editing in a form 430, FIG. 4B is a schematic diagram showing the field 431 when selected, and FIGS. 4C-4D are schematic diagrams showing various parameters for defining at least one condition for controlling the Editable property of the selected field 431 of the form 430 in the configuration mode. FIGS. 4E-4F are schematic diagrams showing various visually presented states of the field 431 and/or the form 430 depending on whether the defined condition of the Editable property is met, when the form 430 is in the execution mode.

In FIG. 4A, a portion of the form 430 in the configuration mode is illustrated. The illustrated portion includes a first field 431, "Site Address," to be controlled by a conditional validation, and a second field 432, "Site Address Update?," for controlling the first field 431. The second field 432 has a set of two associated with radio buttons 433, 434 corresponding to two values "Yes" and "No" of the second field 432. The selection of one of the radio buttons 433, 434 is used in a conditional validation Editable of the first field 431 to control whether the first field 431 is editable or not.

In FIG. 4B, in response to user selection of the first field 431, a menu 228 is displayed for the selected field, as described with respect to FIG. 2B. In response to user selection of the edit option 230 in the menu 228, a screen 232 is displayed by the GUI of the view builder 110, as described with respect to FIG. 2C. Upon user selection of Editable in the screen 232 in FIG. 2C, the view builder 110 causes a screen 400 to be displayed as shown in FIGS. 4C-4D.

In FIGS. 4C-4D, the screen 400 is similar to the screen 300, and comprises a scroll bar 402, drop-down menus 404, 406, 408, 410, Cancel button 416, Save button 418, a check box 420, and an additional drop-down menu 422. In at least one embodiment, the scroll bar 402, drop-down menus 404, 406, 408, 410, Cancel button 416, Save button 418, and check box 420 correspond to the scroll bar 302, drop-down menus 304, 306, 308, 310, Cancel button 316, Save button 318, and check box 320 described with respect to FIGS. 3A-3B.

In some embodiments, the drop-down menu 406 includes a single selectable field corresponding to the second field 432, "Site Address Update?," for controlling the selected first field 431, "Site Address." The drop-down menu 408 includes a single selectable relation "Equal," and the drop-down menu 410 includes a single selectable item "Other." Upon user selection of the item "Other" from the drop-down menu 410, the view builder 110 displays the additional drop-down menu 422 with two selectable items "Yes" and "No" corresponding to the radio buttons 433, 434 associated with the second field 432. The condition defined by the set of user inputs selected from the drop-down menus 406, 408, 410, 412 is "Site Address Update? is Equal to Yes." Coupled with the value "Yes" selected at the drop-down menu 404, the conditional validation Editable is defined as: Site Address will be editable when Site Address Update? is Equal to Yes. The view builder 110 is configured to automatically generate source code corresponding to the defined condition and/or conditional validation and the automatically generated source code is then stored with the form 430, as described with respect to FIGS. 3A-3B, with one or more advantages as described herein.

In FIGS. 4E-4F, the portion of the form 430 with the first field 431 for which a conditional validation Editable is defined based on the second field 432, as described with respect to FIGS. 4C-4D, is shown in the execution mode.

In FIG. 4E, when the radio button 433, "Yes," is selected for the second field 432, "Site Address Update?," the defined condition is satisfied, and the first field 431, "Site Address," is editable. Data, e.g., "USA," may be entered into the editable first field 431, as shown in FIG. 4E.

In FIG. 4F, when the radio button 434, "No," is selected for the second field 432, "Site Address Update?," the defined condition is not satisfied, and the first field 431, "Site Address," is dynamically changed in real time to be a non-editable field. For example, the first field 431 is greyed-out, to prevent data entry into this now non-editable field, as shown in FIG. 4F.

Figure 5E:
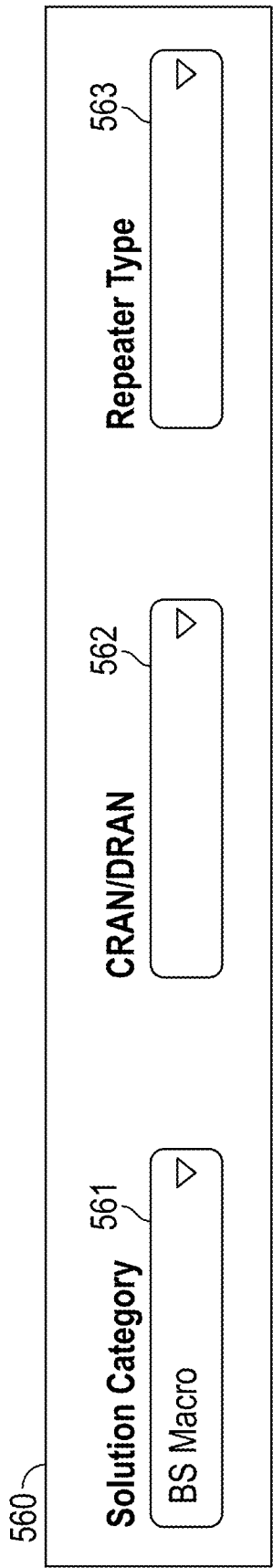
Figure 5F:
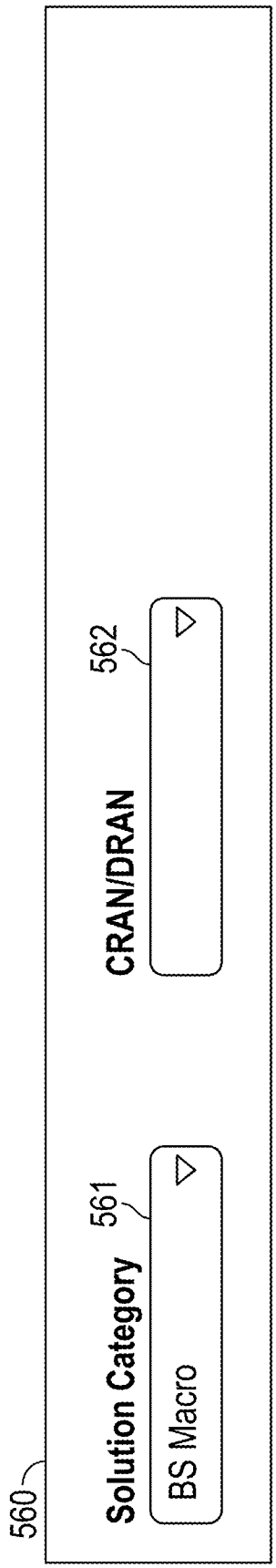
Figure 5G:
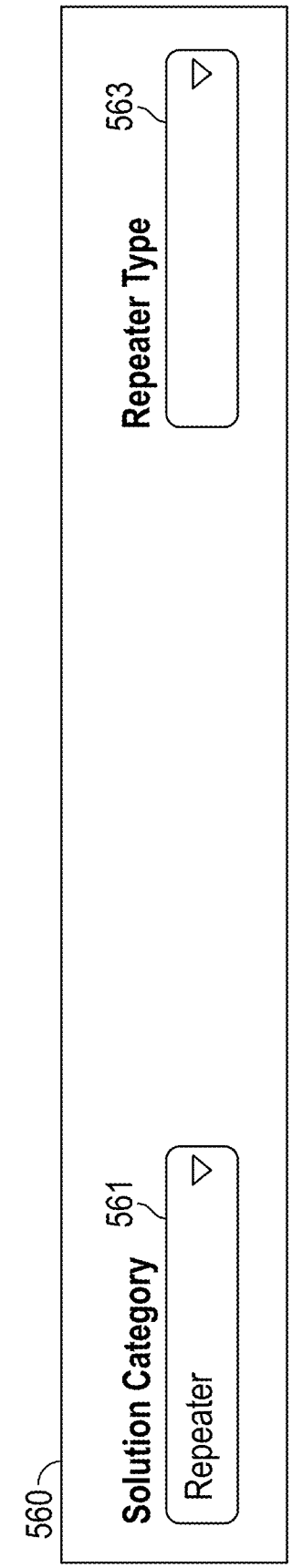

FIGS. 5A-5G are schematic diagrams related to a Visible property, in accordance with some embodiments. Specifically, FIGS. 5A-5B are schematic diagrams showing an alternative option for defining at least one condition for controlling the Visible property of a selected field of a form in the configuration mode. FIGS. 5C-5D are schematic diagrams showing various visually presented states of a field and/or a form depending on whether a defined condition of the Visible property for the field is met, when the form is in the execution mode. FIGS. 5E-5G are schematic diagrams showing various visually presented states of various fields in a further form depending on whether a defined condition of the Visible property is met, when the further form is in the execution mode.

In response to user selection of Visible in the screen 232 in FIG. 2C, the view builder 110 causes a screen 500 to be displayed as shown in FIGS. 5A-5B. The screen 500 is similar to the screens 300, 400 and comprises various drop-down menus, buttons, etc., as described with respect to FIGS. 3A-3B, 4C-4D. For simplicity, a scroll bar 502, drop-down menu 504, Cancel button 516, Save button 518, and check box 520 are illustrated in FIGS. 5A-5B, whereas other elements of the screen 500 are omitted. The scroll bar 502, drop-down menu 504, Cancel button 516, Save button 518, and check box 520 correspond to scroll bar 302, drop-down menu 304, Cancel button 316, Save button 318, and check box 320 described with respect to FIGS. 3A-3B.

In the example in FIGS. 5A-5B, instead of using various drop-down menus for selecting/entering a set of user inputs defining a condition as described with respect to FIGS. 3A-3B, 4C-4D, the user instead checks the check box 520 (FIG. 5A) which causes the view builder 110 to display an expression input area 522 (FIG. 5B) for accepting a logic and/or mathematic expression manually entered by the user. The view builder 110 is also caused to display a further drop-down menu 526 (FIG. 5A) for the user to select one or more components to be quickly inserted in the expression input area 522. In some embodiments, the drop-down menu 526 includes a list of available fields similar to the list 220 described with respect to FIG. 2A. Other components includable in the drop-down menu 526 are within the scopes of various embodiments. An example expression is shown in the expression input area 522 in FIG. 5B, and includes multiple conditions connected by AND operands represented by "&&." Other operands are usable in various embodiments. When the multiple conditions are satisfied, the selected field becomes visible as defined by the user selection at the drop-down menu 504 in FIG. 5A.

The described expression option requires the user to have a certain level of programing experience and/or knowledge, but is advantageous in its flexibility. Specifically, it is possible for the user to define one or more conditions without being limited to the selectable items included in the drop-down menus as described herein. For example, the user may manually enter a condition using a field or another parameter not included in the drop-down menus, a mathematical expression, or the like. The view builder 110 is configured to automatically generate source code corresponding to the manually entered expression in the expression input area 522, and the automatically generated source code is then stored with the form, as described with respect to FIGS. 3A-3B, with one or more advantages as described herein.

It should be noted that, in at least one embodiment, the expression option using the check box 520 and expression input area 522 is an alternative to, and does not exclude, the operation for defining conditions using drop-down menus described with respect to FIGS. 3A-3B, 4C-4D. For example, FIGS. 5C-5D are schematic diagrams showing a portion of a form 530 which is in the execution mode and for which a conditional validation Visible is defined in a manner similar to that described with respect to FIGS. 4A-4E. It should be noted that the conditional validation Visible defined for the form 530 in FIGS. 5C-5D is not related to the example expression in the expression input area 522 of FIG. 5B.

In FIG. 5C, the form 530 includes fields 535, 536 which belong to a field group 537. Fields in the same group share one or more common properties. For example, the fields 535, 536 share the same Visible property which is also the Visible property of the field group 537. A conditional validation Visible is defined for the Visible property of the field group 537 to be controlled by another field 532 with radio buttons 533, 534, in a manner similar to that described with respect to FIGS. 4C-4D. When the radio button 533, "Yes," is selected for the field 532, a condition of the defined conditional validation Visible is satisfied, and the field group 537, including both fields 535, 536 becomes visible, i.e., shown, for data entry.

In FIG. 5D, when the radio button 534, "No," is selected for the field 532, the condition of the defined conditional validation Visible is not satisfied, and the field group 537, including both fields 535, 536 is dynamically changed in real time to be invisible, i.e., hidden. Because the fields 535, 536 for entry of data specific to the value "Yes" of the field 532 are hidden when the value of the field 532 is "No," the user interface, i.e., the form 530, becomes less crowded which helps the end-user from being distracted by unnecessary date items.

FIGS. 5E-5G are schematic diagrams showing a further form 560 in the execution mode.

In FIG. 5E, the form 560 includes fields 561, 562, 563. The field 562, "CRAN/DRAN," and the field 563, "Repeater Type" have respective conditional validations Visible defined based on different values of the field 561, "Solution Category." When the field 561 is blank, the conditional validations Visible of the fields 562, 563 are both satisfied (valid), and the fields 562, 563 are both visible.

In FIG. 5F, when "BS Macro" is entered/selected in the field 561, the conditional validation Visible of the field 562 is valid, but the conditional validation Visible of the field 563 is invalid. As a result, the field 562 is visible whereas the field 563 is hidden.

In FIG. 5G, when "Repeater" is entered/selected in the field 561, the conditional validation Visible of the field 562 is invalid, but the conditional validation Visible of the field 563 is valid. As a result, the field 563 is visible whereas the field 562 is hidden.

Figure 6A:
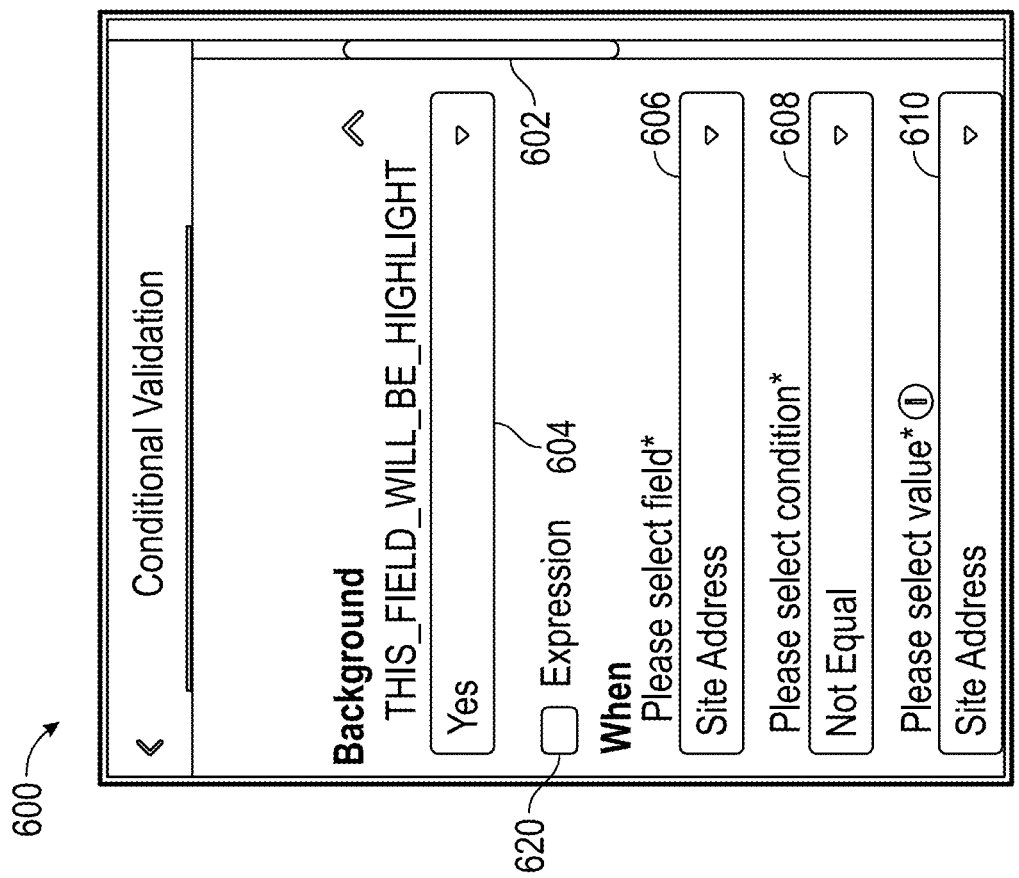

FIGS. 6A-6C are schematic diagrams related to a Background property, in accordance with some embodiments. Specifically, FIG. 6A is a schematic diagram showing various parameters for defining at least one condition for controlling the Background property of a selected field of a form in the configuration mode. FIGS. 6B-6C are schematic diagrams showing various visually presented states of the field and/or the form depending on whether the defined condition of the Background property is met, when the form is in the execution mode.

In response to user selection of Background in the screen 232 in FIG. 2C, the view builder 110 causes a screen 600 to be displayed as shown in FIG. 6A. The screen 600 is similar to the screens 300, 400 and comprises various drop-down menus, buttons, etc., as described with respect to FIGS. 3A-3B, 4C-4D. For simplicity, a scroll bar 602, drop-down menus 604, 606, 608, 610, and check box 620 are illustrated in FIG. 6A, whereas other elements of the screen 600 are omitted. The scroll bar 602, drop-down menus 604, 606, 608, 610, and check box 620 correspond to the scroll bar 302, drop-down menus 304, 306, 308, 310, and check box 320 described with respect to FIGS. 3A-3B. A conditional validation Background is defined for the selected field, using various drop-down menus 604, 606, 608, 610 in a manner similar to that described with respect to FIGS. 3A-3B. The view builder 110 is configured to automatically generate source code corresponding to the defined conditional validation Background, and the automatically generated source code is then stored with the form, with one or more advantages as described herein.

In FIGS. 6B-6C, a portion of a form 630 for which the conditional validation Background is defined is shown in the execution mode. In this example, fields 631-633 belong to the same field group for which the conditional validation Background is defined.

In FIG. 6B, the condition in the conditional validation Background is satisfied for the first time. For example, the condition is satisfied when the entered data are incorrect or inconsistent (the region "Central" in field 633 is incorrect or inconsistent with "District of Columbia" and "DC" in fields 631, 632). As a result, the field group including the fields 631-633 is highlighted to be distinctive from other fields (not shown) in the same form 630. For example, the background of the fields 631-633 is changed to the grey color whereas the background of the other fields in the form 630 remains white.

In FIG. 6C, the condition in the conditional validation Background is satisfied for the second time. For example, the condition is satisfied when the entered data are again incorrect or inconsistent (the region "NorthEast" in field 633 is incorrect or inconsistent with "Banner" and "NE" in fields 631, 632). As a result, the field group including the fields 631-633 is highlighted to be distinctive from other fields (not shown) in the same form 630, but in a manner different from the first time the condition is satisfied as described with respect to FIG. 6B. For example, when the condition is satisfied (data entry is incorrect/inconsistent) for the second time, the background of the fields 631-633 is changed to the light blue color whereas the background of the other fields in the form 630 remains white. The described specific colors and/or the number of times the condition is satisfied before the change in the background color occurs are examples. Other configurations are within the scopes of various embodiments. By highlighting certain fields in a distinctive manner from other fields and/or by changing the background color of the fields when the same condition is satisfied a predetermined number of times, it is possible to bring the end-user's attention to certain data to be entered, thereby reducing the likelihood of incorrect data entry and/or prompting the end-user to double-check the entered data.

Figure 7:
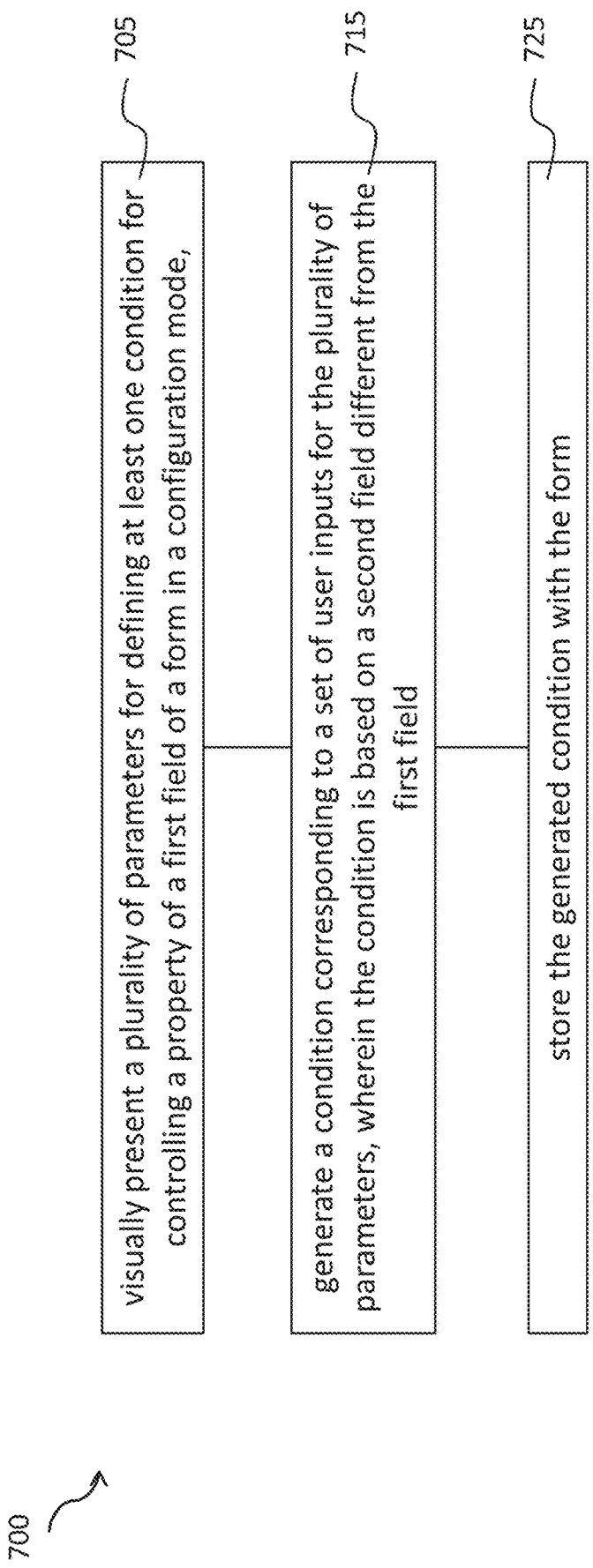
FIGS. 7-8 are flow charts of various processes, in accordance with some embodiments.

FIG. 7 is a flow chart of a process for creating or modifying a conditional validation, in accordance with some embodiments. In at least one embodiment, the process 700 is performed by the view builder 110 in the configuration mode, as described with respect to one or more of FIGS. 2A-6C.

At operation 705, a plurality of parameters for defining at least one condition for controlling a property of a first field of a form in a configuration mode is visually presented. For example, various parameters are visually presented by corresponding drop-down menus as described herein. Other manners for visually presenting selectable parameters are within the scopes of various embodiments. The property to be controlled is one of the Mandatory property, Editable property, Visible property, Mandatory property as described herein, or any other property. The first field corresponds to a field selected to be edited as described with respect to FIGS. 2A-2C.

At operation 715, a condition corresponding to a set of user inputs for the plurality of parameters is generated, wherein the condition is based on a second field different from the first field. For example, the user selects parameters from the drop-down menus and/or enters a desirable parameter through an input area, as described herein. The selected/entered parameters define a set of user inputs and the corresponding condition which is based on a second field different from the first field selected to be controlled. For an example, in FIGS. 3A-3D, a condition based on the second field "Site Address 1" controls the Mandatory property of the first/selected field "Site Address." For another example, in FIGS. 4A-4F, a condition based on the second field 432 controls the Editable property of the first/selected field 431. A further example is in FIGS. 5C-5D, where a condition based on the second field 532 controls the Visible property of a group 537 of multiple fields 535, 536. It is possible to impose multiple conditions from one or more other fields on the selected field, as described herein.

At operation 725, the generated condition is stored with the form. For example, as described herein, the view builder 110 automatically generates source code corresponding to the generated condition and/or the defined conditional validation, and stores the automatically generated source code with the form, e.g., in the JSON configuration of the form. The stored source code is executed when the form is rendered in the execution mode, either for previewing/testing at the view builder 110 or for data entry and/or manipulation by an end-user.

In some embodiments, conditional validations facilitate the user to impose multiple conditions on any field of a view or form based on other available fields on the form, or not on the form but in the same database. Some embodiments utilize creation of forms, automate the creation of source code for conditional validation in a form, based on the form and user input parameters included in form. This helps to reduce the manual process through designs of generic forms per users' need. Users may add fields from existing resources, e.g., database tables, set conditional validations, layouts, conditions for different parameters in the fields of forms. This also helps the user (customer) to handle complex forms by themselves without requiring assistance of the original form creator/developer.

In at least one embodiment, a condition for a conditional validation is defined by selecting desired parameters from among existing parameters. When a condition may not be created using existing parameters, the user is given an option to manually enter logic and/or mathematical expressions to achieve the desired conditional validation. Although manually entered expressions require certain amount of manual handling and/or programming on the user's part, it is still less intensive than if the user needs to do manual coding to obtain the required source code as in the other and/or existing approaches.

In at least one embodiment, advantages provided by the described conditional validation for view builder include, but are not limited to, user-friendly user interfaces for easy configuration and/or execution, no or low requirement of technical expertise to configure views (forms), faster execution since the software and/or source code are JSON based.

Figure 8:
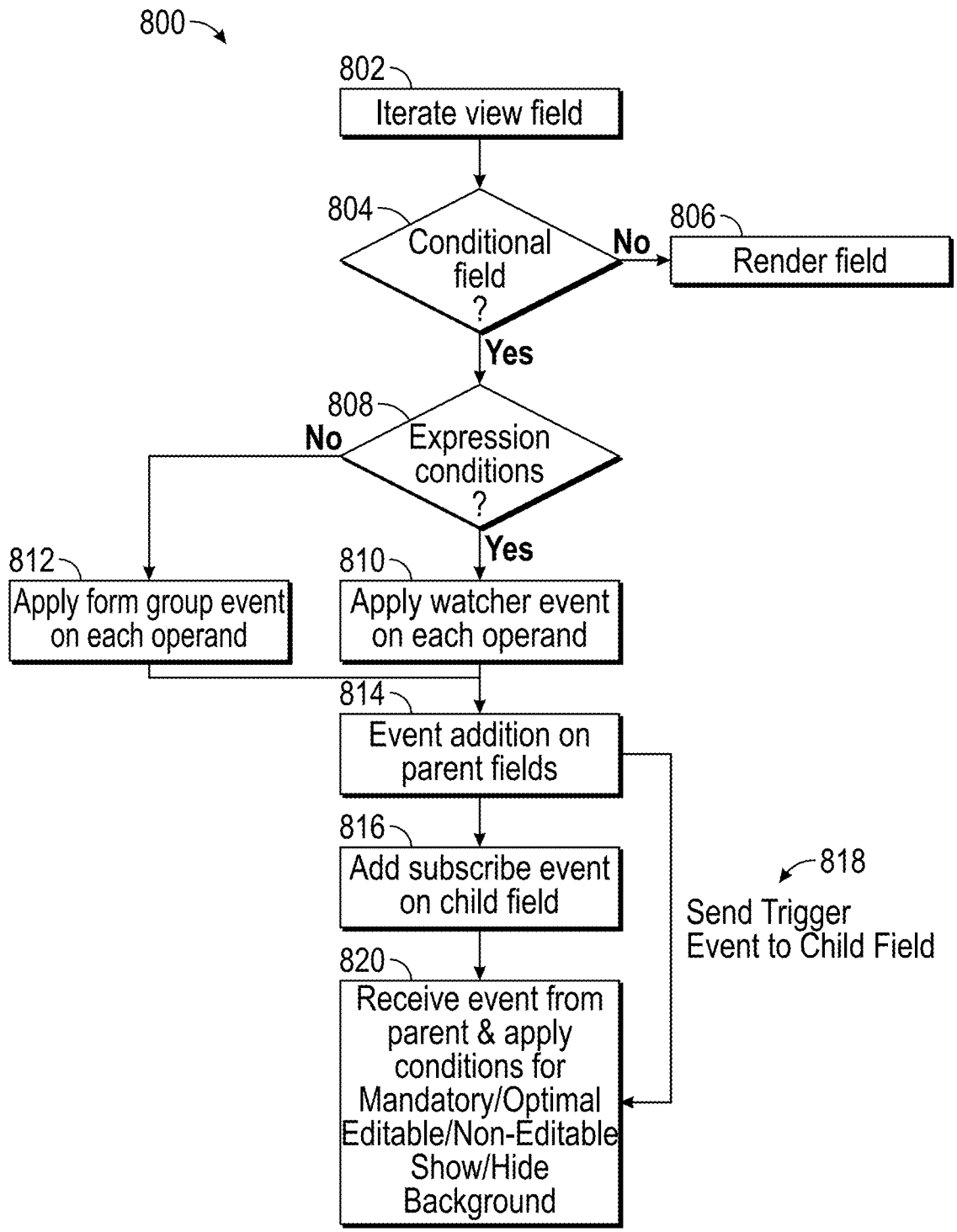

FIG. 8 is a flow chart of a process 800 for rendering a form having a conditional validation, in accordance with some embodiments. In at least one embodiment, the process 800 is performed by the view builder 110 for previewing/testing or at the computer system 140 for data entry and/or manipulation by an end-user. In some embodiments, the form is rendered by accessing and/or executing a JSON configuration of the form.

At operation 802, a current field in the form is processed.

At operation 804, it is determined, based on a description of the current field in the JSON configuration, whether the current field is a conditional field or not.

At operation 806 corresponding to a determination at operation 804 that the current field is not a conditional field, the current field is rendered without a conditional validation.

At operation 808 corresponding to a determination at operation 804 that the current field is a conditional field, it is determined whether a condition associated with the current field includes an expression, e.g., an expression entered via an expression input area 522 described with respect to FIG. 5B.

At operation 810 corresponding to a determination at operation 808 that a condition associated with the current field includes an expression, a watcher event is applied for each operand in the expression. In some embodiments, a watcher event includes codes, e.g., written in Java, to calculate and apply condition logic on a parameter. The computer system executes the query entered at the time of configuration.

At operation 812 corresponding to a determination at operation 808 that no conditions associated with the current field include an expression, i.e., the conditions associated with the current field are defined by user inputs/selections of parameters as described herein, a form group event is applied on each operand between conditions. As described herein, operands include logical operators (such as AND, OR, or the like) between parameters for defining a condition. In some embodiments, a form group event is an Angular java script event.

At operation 814, event addition on parent fields of the current field is performed based on the result output from operation 810 or operation 812. A parent field is the field that controls the behavior of another field. For example, field 432 in FIG. 4A is a parent field and field 431 is a child field.

At operation 816, a subscribe event is added on a child field of the current field, and in parallel, at operation 818, a trigger event is sent to the child field. In at least one embodiment, operation 816 is an event which is triggering event based on operation 814. For example, for a parent field, it is a condition that some changes are applying and, based on such changes, a child field will get a trigger to accept the changes. In at least one embodiment, at operation 818, based on triggering event, a trigger is sent to the child field.

At operation 820, one or more events from the parent fields are received and applied to the conditions associated with the current field to control one or more of the Mandatory property, Visible property, Editable property and Background property of the current field. In other words, operation 820 outputs the final result of the conditional validation.

The described methods and algorithms include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

Figure 9:
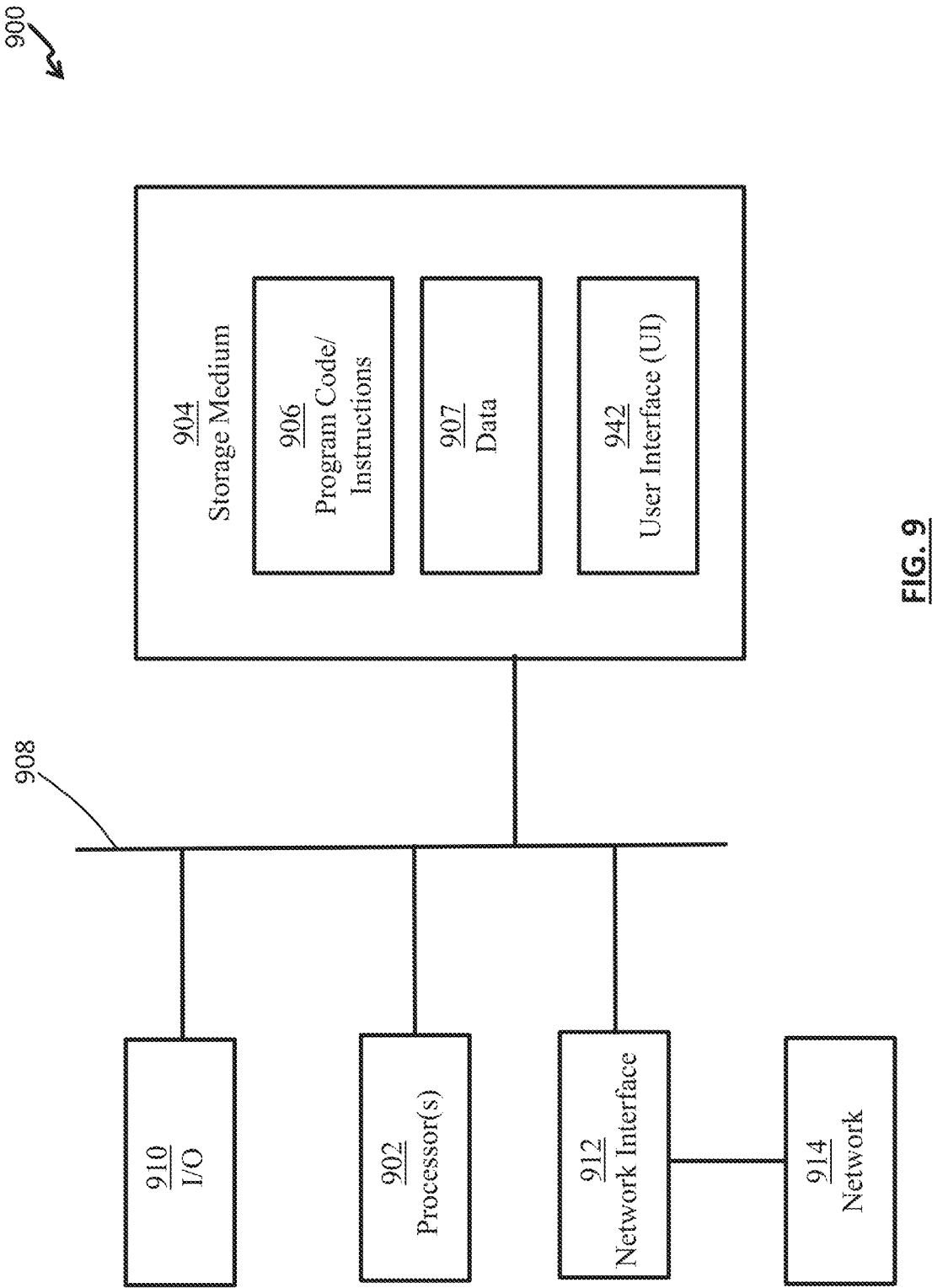
FIG. 9 is a schematic block diagram of a computer system, in accordance with some embodiments.

FIG. 9 is a schematic block diagram of a computer system 900, in accordance with some embodiments. Examples of the computer system 900 include, but are not limited to, desktop, a laptop, a tablet, a smart phone, a server, or the like.

The computer system 900 includes a hardware processor 902 and a non-transitory, computer-readable storage medium 904. Storage medium 904, amongst other things, is encoded with, i.e., stores, computer program code 906, i.e., a set of executable instructions, such as one or more algorithms, programs, applications, sets of executable instructions for a view builder, or the like, as described with respect to one or more of FIGS. 1-8. Execution of instructions 906 by hardware processor 902 implements a portion or all of the methods described herein in accordance with one or more embodiments (hereinafter, the noted processes and/or methods).

Processor 902 is coupled to non-transitory computer-readable storage medium 904 via a bus 908. Processor 902 is also coupled to an I/O interface 910 by bus 908. A network interface 912 is connected to processor 902 via bus 908. Network interface 912 is connected to a network 914, so that processor 902 and computer-readable storage medium 904 are connectable to external elements or devices via network 914. Processor 902 is configured to execute computer program code 906 encoded in computer-readable storage medium 904 in order to cause computer system 900 to be usable for performing a portion or all of the noted processes and/or methods. In one or more embodiments, processor 902 comprises a central processing unit (CPU), a multi-processor, a distributed processing system, an application specific integrated circuit (ASIC), and/or a suitable hardware processing unit.

In one or more embodiments, computer-readable storage medium 904 comprises an electronic, magnetic, optical, electromagnetic, infrared, and/or a semiconductor system (or apparatus or device). For example, computer-readable storage medium 904 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 904 includes a compact disk-read only memory (CD-ROM), a compact disk-read/write (CD-R/W), and/or a digital video disc (DVD).

In one or more embodiments, storage medium 904 stores computer program code 906 configured to cause computer system 900 to be usable for performing a portion or all of the noted processes and/or methods. In one or more embodiments, storage medium 904 also stores information or data 907, such as event data, consumer data, business data, policies, component configurations or the like, used in a portion or all of the noted processes and/or methods.

I/O interface 910 is coupled to external circuitry. In one or more embodiments, I/O interface 910 includes a keyboard, keypad, mouse, trackball, trackpad, touchscreen, and/or cursor direction keys for communicating information and commands to processor 902. Computer system 900 is configured to receive information through I/O interface 910. The information received through I/O interface 910 includes one or more of instructions, data, policies, configurations and/or other parameters for processing by processor 902. The information is transferred to processor 902 via bus 908. Computer system 900 is configured to receive information related to a user interface through I/O interface 910. The information is stored in computer-readable storage medium 904 as user interface (UI) 942.

Network interface 912 allows computer system 900 to communicate with network 914, to which one or more other computer systems are connected. Network interface 912 includes wireless network interfaces such as BLUETOOTH, WIFI, WIMAX, GPRS, LTE, 5G, 6G, WCDMA, or the like; or wired network interfaces such as ETHERNET, USB, IEEE-864 or the like. In one or more embodiments, a portion or all of noted processes and/or methods, is implemented in two or more computer system 900.

In some embodiments, a portion or all of the noted processes and/or methods is implemented as a standalone software application for execution by one or more hardware processors. In some embodiments, a portion or all of the noted processes and/or methods is implemented as a software application that is a part of an additional software application. In some embodiments, a portion or all of the noted processes and/or methods is implemented as a plug-in to a software application.

In some embodiments, a portion or all of the noted processes and/or methods is realized as functions of a program stored in a non-transitory computer readable recording medium. The non-transitory computer readable recording medium having the program stored therein is a computer program product. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, or the like.

In some embodiments, a system for conditional validation in forms comprises at least one processor, and at least one memory coupled to the at least one processor and configured to store executable instructions. The executable instructions, when executed by the at least one processor, cause the at least one processor to visually present a plurality of parameters for defining at least one condition for controlling a property of a first field of a form in a configuration mode, generate a condition corresponding to a set of user inputs for the plurality of parameters, and store the generated condition with the form. The condition is based on a second field different from the first field.

In some embodiments, a method of conditional validation in forms is performed at least in part by at least one processor and comprises visually presenting a plurality of parameters for defining at least one condition for controlling a property of a first field of a form in a configuration mode, generating a condition corresponding to a set of user inputs for the plurality of parameters, and storing the generated condition with the form. The condition is based on a second field different from the first field.

In some embodiments, a computer program product comprises a non-transitory, tangible computer readable storage medium storing a computer program that, when executed by at least one processor, causes the at least one processor to visually present a plurality of parameters for defining at least one condition for controlling a property of a first field of a form in a configuration mode, generate a condition corresponding to a set of user inputs for the plurality of parameters, and store the generated condition with the form. The condition is based on a second field different from the first field.

The foregoing outlines features of several embodiments so that those skilled in the art better understand the aspects of the present disclosure. Those skilled in the art should appreciate that they readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they make various changes, substitutions, and alterations herein without departing from the spirit and scope of the present disclosure.

What is claimed is:

1. A system for conditional validation in forms, the system comprising:
    at least one processor; and
    at least one memory coupled to the at least one processor and configured to store executable instructions that, when executed by the at least one processor, cause the at least one processor to, in a configuration mode,
        visually present a plurality of parameters for defining at least one condition for controlling a property of a first field of a form in the configuration mode,
        generate a condition corresponding to a set of user inputs for the plurality of parameters, and
        store the generated condition with the form,
    wherein
    the condition is based on a second field different from the first field,
    the executable instructions, when executed by the at least one processor, further cause the at least one processor to render the form in an execution mode in which the first field is dynamically changed to have different visually presented states depending on whether the second field satisfies the condition or not, and
    the property is one of a plurality of properties of the first field, the plurality of properties comprising:
        a mandatory property which, in the execution mode,
            in response to the second field satisfying the condition, configures the first field as mandatory to require data to be entered in the first field, and
            in response to the second field not satisfying the condition, configures the first field as non-mandatory to not require data to be entered in the first field,
        a visible property which, in the execution mode,
            in response to the second field satisfying the condition, causes the first field to be visible in the form, and
            in response to the second field not satisfying the condition, causes the first field to be hidden in the form,
        an editable property which, in the execution mode,
            in response to the second field satisfying the condition, configures the first field as editable to permit data to be entered in the first field, and
            in response to the second field not satisfying the condition, configures the first field as non-editable to prevent data entry in the first field which remains visibly presented in the form, and
        a background property which, in the execution mode,
            in response to the second field satisfying the condition, causes the first field to be visibly presented in a predetermined format distinctive from other fields in the form, and
            in response to the second field not satisfying the condition, causes the first field to be not visibly presented distinctive from the other fields in the form.

2. The system of claim 1, wherein
the executable instructions, when executed by the at least one processor, further cause the at least one processor to, in the configuration mode,
    generate a further condition corresponding to a further set of user inputs for the plurality of parameters, and
    store the generated further condition with the form,
wherein the further condition is based on a third field different from both the first field and the second field.

3. The system of claim 1, wherein
the second field is in a further form different from the form containing the first field.

4. The system of claim 1, wherein
the set of user inputs comprises items each selected from a visually presented list of items corresponding to a parameter among the plurality of parameters.

5. The system of claim 1, wherein
the executable instructions, when executed by the at least one processor, further cause the at least one processor to, in the configuration mode,
    in response to user selection of a parameter among the plurality of parameters, visually present a plurality of items corresponding to the selected parameter, and
    in response to user selection of an item among the plurality of items, accept the selected item as a user input for the selected parameter in the set of user inputs.

6. The system of claim 1, wherein
the plurality of parameters comprises first through fourth parameters,
the executable instructions, when executed by the at least one processor, further cause the at least one processor to, in the configuration mode,
    in response to user selection of the first parameter, visually present a first list of selectable property values of the property of the first field,
    in response to user selection of the second parameter, visually present a second list of one or more selectable fields including the second field,
    in response to user selection of the third parameter, visually present a third list of one or more selectable relations,
    in response to user selection of the fourth parameter, visually present an input area and/or a fourth list of one or more selectable values, and
    generate the condition based on
        a selected property value from the first list,
        the second field selected from the second list,
        a selected relation from the third list, and
        a selected value from the fourth list or an input value received through the input area.

7. The system of claim 1, wherein
the executable instructions, when executed by the at least one processor, further cause the at least one processor to, in the configuration mode,
    visually present a list of the plurality of properties of the first field, and visually present the plurality of parameters in response to user selection of the property from the list of the plurality of properties.

8. The system of claim 7, wherein
the list of the plurality of properties comprises:
the mandatory property,
the editable property,
the visible property, and
the background property.

9. The system of claim 1, wherein
the executable instructions, when executed by the at least one processor, further cause the at least one processor to
add a new field selected from a visually presented list of available fields to the form.

10. The system of claim 1, wherein
the executable instructions, when executed by the at least one processor, further cause the at least one processor to, in the configuration mode,
visually present an expression input area for accepting a logic and/or mathematic expression corresponding to one or more conditions for controlling the property of the first field.

11. The system of claim 1, wherein
the background property, in the execution mode,
in response to the second field satisfying the condition for fewer than a predetermined number of times, causes the first field to be visibly presented in the predetermined format, which is a first format, distinctive from the other fields in the form, and in response to the second field satisfying the condition for the predetermined number of times, causes the first field to be visibly presented in a predetermined second format distinctive from the other fields in the form and distinctive from the first format, and the predetermined number of times is greater than one.

12. The system of claim 1, wherein
in the execution mode, for each conditional field in the form, the at least one processor is caused to
receive at least one event from at least one parent field of the conditional field,
apply the received at least one event to at least one condition associated with the conditional field, and
cause the conditional field to be visually presented in accordance with the at least one condition and the applied at least one event.

13. The system of claim 12, wherein
in the execution mode, the at least one processor is caused to
send at least one triggering event to at least one child field of the conditional field.

14. A method of conditional validation in forms, said method performed at least in part by at least one processor and comprising:
in a configuration mode,
visually presenting a plurality of parameters for defining at least one condition for controlling a property of a first field of a form in the configuration mode;
generating a condition corresponding to a set of user inputs for the plurality of parameters; and
storing the generated condition with the form;
wherein
the condition is based on a second field different from the first field,
the method further comprises rendering the form in an execution mode in which the first field is dynamically changed to have different visually presented states depending on whether the second field satisfies the condition or not, and
the property is one of a plurality of properties of the first field, the plurality of properties comprising:
a mandatory property which, in the execution mode,
in response to the second field satisfying the condition, configures the first field as mandatory to require data to be entered in the first field, and
in response to the second field not satisfying the condition, configures the first field as non-mandatory to not require data to be entered in the first field,
a visible property which, in the execution mode,
in response to the second field satisfying the condition, causes the first field to be
visible in the form, and
in response to the second field not satisfying the condition, causes the first field to be hidden in the form,
an editable property which, in the execution mode,
in response to the second field satisfying the condition, configures the first field as editable to permit data to be entered in the first field, and
in response to the second field not satisfying the condition, configures the first field as non-editable to prevent data entry in the first field which remains visibly presented in the form, and
a background property which, in the execution mode,
in response to the second field satisfying the condition, causes the first field to be visibly presented in a predetermined format distinctive from other fields in the form, and
in response to the second field not satisfying the condition, causes the first field to be not visibly presented distinctive from the other fields in the form.

15. The method of claim 14, wherein
said storing comprises updating a JavaScript Object Notation (JSON) configuration of the form with the generated condition.

16. The method of claim 14, wherein
said storing comprises updating a JavaScript Object Notation (JSON) configuration of the form with the generated condition, without writing an Extensible Markup Language (XML) or Hyper Text Markup Language (HTML) file.

17. The method of claim 14, wherein
said generating and said storing require no coding by a user.

18. The method of claim 14, wherein
the background property, in the execution mode,
in response to the second field satisfying the condition for fewer than a predetermined number of times, causes the first field to be visibly presented in the predetermined format, which is a first format, distinctive from the other fields in the form, and
in response to the second field satisfying the condition for the predetermined number of times, causes the first field to be visibly presented in a predetermined second format distinctive from the other fields in the form and distinctive from the first format, and
the predetermined number of times is greater than one.

19. The method of claim 14, wherein
said rendering is performed without linking the form with a database including the first field.

20. A computer program product, comprising a non-transitory, tangible computer readable storage medium storing a computer program that, when executed by at least one processor, causes the at least one processor to, in a configuration mode:
- visually present a plurality of parameters for defining at least one condition for controlling a property of a first field of a form in the configuration mode,
- generate a condition corresponding to a set of user inputs for the plurality of parameters, and
- store the generated condition with the form,
- wherein
- the condition is based on a second field different from the first field,
- the computer program, when executed by the at least one processor, further causes the at least one processor to render the form in an execution mode in which the first field is dynamically changed to have different visually presented states depending on whether the second field satisfies the condition or not, and
- the property is one of a plurality of properties of the first field, the plurality of properties comprising:
  - a mandatory property which, in the execution mode,
    - in response to the second field satisfying the condition, configures the first field as mandatory to require data to be entered in the first field, and
    - in response to the second field not satisfying the condition, configures the first field as non-mandatory to not require data to be entered in the first field,
  - a visible property which, in the execution mode,
    - in response to the second field satisfying the condition, causes the first field to be visible in the form, and
    - in response to the second field not satisfying the condition, causes the first field to be hidden in the form,
  - an editable property which, in the execution mode,
    - in response to the second field satisfying the condition, configures the first field as editable to permit data to be entered in the first field, and
    - in response to the second field not satisfying the condition, configures the first field as non-editable to prevent data entry in the first field which remains visibly presented in the form, and
  - a background property which, in the execution mode,
    - in response to the second field satisfying the condition, causes the first field to be visibly presented in a predetermined format distinctive from other fields in the form, and
    - in response to the second field not satisfying the condition, causes the first field to be not visibly presented distinctive from the other fields in the form.

* * * * *